United States Patent [19]

Maas

[11] Patent Number: 4,846,260
[45] Date of Patent: Jul. 11, 1989

[54] COOLING SYSTEM

[75] Inventor: Harvey E. Maas, Renton, Wash.

[73] Assignee: Reliance Electric Company, Greenville, S.C.

[21] Appl. No.: 187,512

[22] Filed: Apr. 28, 1988

Related U.S. Application Data

[62] Division of Ser. No. 948,311, Dec. 31, 1986, Pat. No. 4,778,000.

[51] Int. Cl.⁴ ............................................. F24H 3/00
[52] U.S. Cl. ........................................ 165/47; 165/41
[58] Field of Search ............... 165/47, 41; 415/219 R; 417/423 R

[56] References Cited

U.S. PATENT DOCUMENTS

| | | | |
|---|---|---|---|
| 3,019,965 | 2/1962 | Lyman | 417/423 R |
| 4,616,693 | 10/1986 | Dietzsch et al. | 62/239 X |
| 4,657,483 | 4/1987 | Bede | 415/219 R |

Primary Examiner—Larry Jones
Attorney, Agent, or Firm—Dority & Manning

[57] ABSTRACT

This invention relates to a cooling system for industrial equipment such as, for example, controlled start transmission gear reducer. The cooling system comprises a fan disposed on the rotatable shaft of the equipment for rotation in either direction and a fan shroud disposed about the fan for directing air currents generated by said fan through a connecting duct to an item or area to be cooled such as clutch. The ducting is connected to said fan shroud by means of an outlet duct which is substantially in the center of the outer periphery of the fan shroud. Disposed within the shroud and pivoted at a point near the periphery of the fan is an air deflector element. A free end of the deflector element is swingable from one side of the outlet ducts to the other side to close off one or the other of the outlet portions of the outlet duct, depending upon the direction of rotation of the fan.

6 Claims, 3 Drawing Sheets

COOLING SYSTEM

This application is a division of patent application Ser. No. 06/948,311 filed Dec. 31, 1986, now U.S. Pat. No. 4,778,000 issued Oct. 18, 1988.

BACKGROUND OF THE INVENTION

This invention relates to a cooling system for controlled start transmission gear reducers, and other industrial equipment where cooling of portions of same are desirable. Controlled start transmission gear reducers utilize controlled braking of the reaction member of a differential gear reducer under the command of a closed loop control system to provide precisely controlled acceleration of high inertial loads. Such reducers are particularly well suited to the power requirements of long belt conveyors where gradual acceleration is desired to minimize belt stress and shock to the mechanical components such as gears, bearings, keys, shafts, couplings, pulleys, splices and other structural members.

Frequent starts of such systems, utilizing the controlled start transmission gear reducer, generates heat in the clutch disk at the output shaft end of the reducer. Cooling of the clutch disk during the operation of the gear reduce is thus very desirable, if not required.

Controlled start transmission gear reducers, as manufactured by The Dodge Division of Reliance Electric Company, Greenville, S.C. include the input shaft located in either the three o'clock position or the nine o'clock position on the input end of the gear reducer. Moreover, such gear reducers are convertible from one position to the other in the field. In either position, the gear reducer must be able to operate in either the clockwise or the counter-clockwise direction. Such requirements dictate a cooling system that is capable of cooling the clutch disk regardless of position the input shaft and regardless of rotational direction of the input shaft.

Conventionally, the gear reducers as noted above, as well as other drive apparatus have utilized an enclosure through which cooling air passed. When, however, fan location or rotational direction is changed, a general decrease in air flow efficiency is present for prior enclosures or shrouds were generally designed with one particular air flow pattern in mind. The present invention overcomes the inefficiencies of prior devices and is equally efficient, regardless of location of the fan or direction of fan rotation.

SUMMARY OF THE INVENTION

It is an object of the present invention to provide a cooling system which will cool industrial apparatus such as a gear reducer clutch and housing regardless of position of the input shaft and regardless of direction of rotation of the input shaft.

It is another object of the invention to provide a cooling system for a controlled start transmission gear reducer which has a shroud which will direct air currents generated by a fan to cool the clutch disk and the housing of the gear reducer, regardless of the direction of rotation of the input shaft.

Yet another object of the present invention is to provide an improved fan cooling arrangement for association with industrial equipment.

The present invention is broadly directed to a shroud which will efficiently conduct air currents generated by a fan, received on a rotatable shaft within the shroud to appropriate ducting communicating with a part or parts of equipment to be cooled, such as, for example a shroud surrounding a clutch disk. Inside of the shroud surrounding the fan is a vane which is pivotally mounted at one end adjacent the periphery of the fan with an opposite end free to swing from a closed position on one side of the output duct of the shroud when the fan rotates in one direction to the opposite side of the output duct of the shroud when the fan rotates in the opposite direction.

BRIEF DESCRIPTION OF THE DRAWINGS

In order that the invention may be better understood, an embodiment thereof will now be described by way of example only, with reference to the attached drawings, in which.

DETAILED DESCRIPTION OF THE INVENTION

Figure 1:
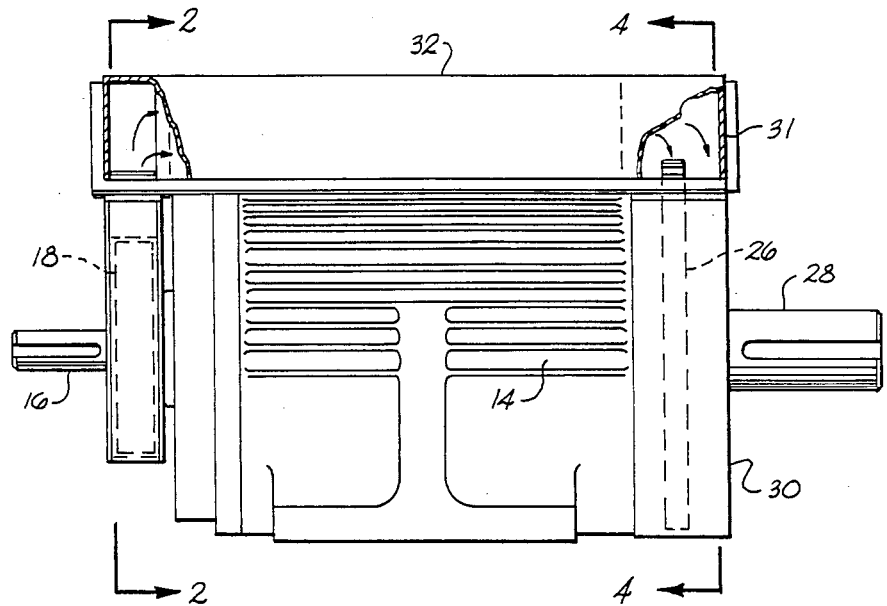
FIG. 1 is a side elevation of a controlled start transmission gear reducer with a cooling system constructed in accordance with the present invention.
Figure 2:
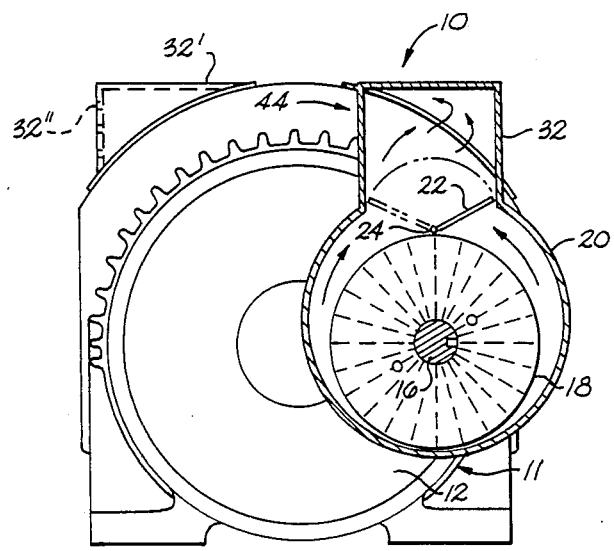
FIG. 2 is an end elevation, partially in section, taken along lines 2—2 of FIG. 1.

Referring now to FIGS. 1, and 2 a controlled start transmission gear reducer generally 10 is illustrated having a housing 11 with a reducer housing front plate 12 on the input end of same. Reducer housing 11 is provided with a plurality of cooling fins 14 for assisting in cooling the housing during the operation of the reducer.

On the input end of the reducer is an input shaft 16. Input shaft 16 may be located at either the three o'clock position (as shown in FIG. 2) or nine o'clock position on reducer front plate 12. Reducer input shaft 16 may be driven in either rotational direction as required. Disposed on the input shaft 16 is a bi-directional fan 18 which has a plurality of radially extending blades which will generate air currents regardless of which direction the input shaft is rotated.

Surrounding fan 18 is a shroud 20, which will be described in more detail hereinafter. Shroud 20 has an outlet duct 44, which has a generally rectangular cross-section and is located in about the center of the shroud 20 at the upper side thereof, generally extending from eleven o'clock to one o'clock as seen in FIG. 2. Centrally located within the outlet duct 44 is a pivoted vane 22. One end of vane 22 is pivoted at 24 adjacent the outer periphery of fan 18. Vane 22 is adapted to pivot from the full line position to the dotted line position, as seen in FIG. 2, depending upon the direction of rotation of fan 18.

Figure 4:
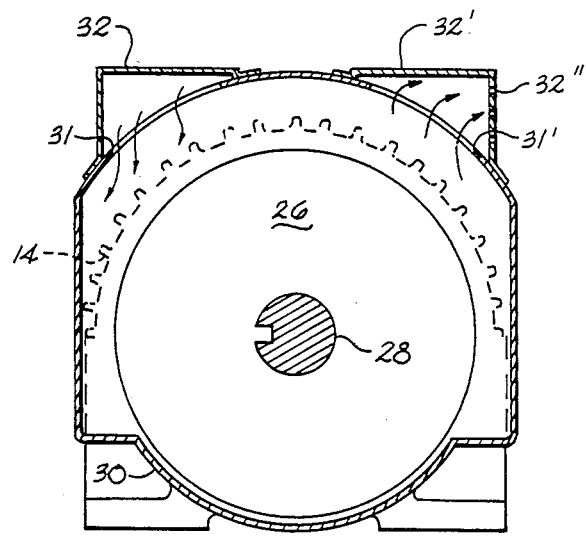
FIG. 4 is an end elevation, partially in section, taken along lines 4—4 of FIG. 1.

On the output end of reducer 10 is a clutch disk 26 which is mounted to a drive output shaft 28. As illustrated herein, output shaft 28 is centrally located on the output end of gear reducer 10. Surrounding clutch disk 26 is a clutch shroud 30 which is provided with an inlet opening 31 adjacent an upper end of same (see FIG. 4). A connecting duct 32 is secured atop housing 11 between fan shroud 20 and clutch disk shroud 30 to permit directed air to flow therebetween. Hence, with fan 18 rotating, air will be forced around fan shroud 20, through outlet duct 44, through connecting duct 32 into clutch disk shroud 30 for the cooling of clutch disc 26.

It will be noted that the reducer housing 11 is illustrated as having a second connecting duct 32′ and a second opening 31′ in clutch shroud 30. Second duct 32′ has a length approximately corresponding to the thickness of clutch shroud 30, and defines perforations 32″. Air entering clutch shroud 30 through opening 31 passes about shroud 30 and exits shroud 30 through opening 31′ and then is exhausted through perforations 32″ of duct 32′. When the reducer input shaft 16 is at the nine o'clock position instead of the three o'clock position shown in FIG. 2, connecting duct 32 and duct 32′ secured.

Figure 3:
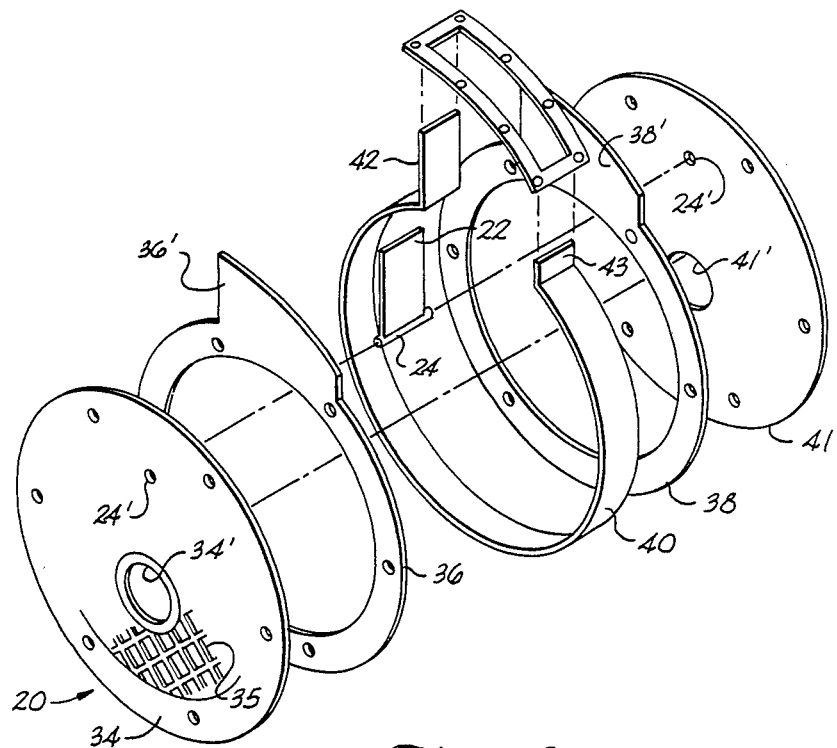
FIG. 3 is an exploded view of the shroud surrounding the fan in FIG. 2.

Referring now, more specifically, to FIG. 3 fan shroud 20 is shown in exploded view. Shroud 20 includes a front screen 34, at least a portion of which includes an expanded steel section 35 or the like for ingress of air. Front screen 34 is bolted to a face plate 36. A back plate 38 has a center back plate 41 bolted thereto. Plates 36 and 38 are, in turn, welded with an air tight weld to a curved side plate 40. Center back plate 41 and screen 34 are provided with openings 24′ for receiving a pivot rod 24 for vane 22 and openings 34′ and 41′, respectively for receipt of input shaft 16. Plates 42 and 43 are welded to curved side plate 40 and to corresponding extensions 36′ and 38′ of face and back plates 36 and 38, respectively, to define outlet duct 44. All welds are air tight to ensure proper air flow.

Center back plate 41 and screen 34 are reversable. Whenever it is desired to move the input shaft from the three o'clock position to the nine o'clock position, fan shroud 20 is reversed and connected to connecting duct 32′ in the same manner in which it was connected to connecting duct 32 in FIG. 2. As noted, particularly in FIG. 2, plate 42 of outlet duct 44 is longer than plate 43 with corresponding slopes or extensions 36′ and 38′. Such arrangement provides an angled upper surface of outlet duct 44 corresponding to curvature of housing 11. Such angular relationship likewise exists upon reversal of shroud 20 to accommodate a fan in the nine o'clock position.

Figure 5A:
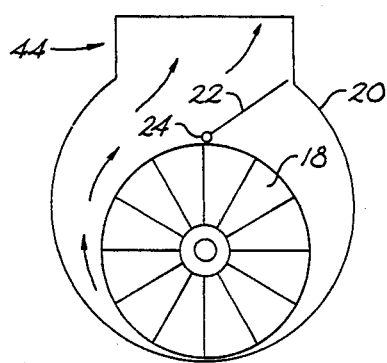
FIG. 5 is a diagrammatic end view of the fan and its surrounding shroud showing the effect of alternative rotational directions for the fan.
Figure 5B:
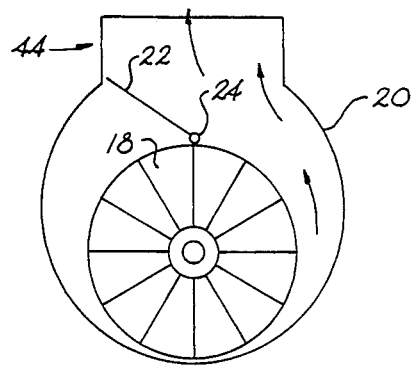

Referring now to FIG. 5 two directions of operation for fan 18 are schematically illustrated. In view A of FIG. 5, fan 18 rotates clockwise, whereby the air currents generated by fan 18 cause vane 22 to pivot clockwise. With vane 22 in the position shown in view A, vane 22 closes off the right-hand portion of shroud 20 so that all air drawn by the fan 18 through screen 34 is directed into outlet duct 44 and, thence, the part or area to be cooled, e.g. clutch disk 26. Conversely, when fan 18 is rotated counter-clockwise as seen in view B of FIG. 5, vane 22 is pivoted counter-clockwise to close off the left-hand portion of shroud 20 and direct all air currents drawn by the fan 18, through screen 34, into and through outlet duct 44.

Thus, it is seen that the cooling system of the present invention will cool the clutch or other desired area or part of the equipment irrespective of whether input shaft 16 is driven clockwise or counter-clockwise. Likewise, since fan shroud 20 is reversible whether the input shaft is located in the three o'clock or nine o'clock position is irrelevant. It is also to be understood that input shaft could be located in the center of the gear reducer if desired without deviating from the scope of the present invention.

While a preferred embodiment of the invention has been illustrated and described hereinabove, it is to be understood that the terms used herein are terms of example only and are not to be construed as limiting the invention. The scope of applicant's invention is to be determined by the appended claims only.

What is claimed is:

1. An improved cooling system for industrial equipment including at least one rotatable shaft and at least one component to be cooled by air currents generated by a bi-directional fan secured to a rotatable shaft and directed to said component through air guiding means comprising a shroud located about said fan, said shroud having an outlet duct associated with said air guiding means for directing air currents generated by rotation of said fan to said air guiding means, said shroud further having an air deflector element received therein for pivotal movement from one side of said outlet duct to an opposite side of said outlet duct as determined by the direction of rotation of said fan such that clockwise rotation of said fan generates air currents which pivot said deflector element clockwise, and counterclockwise rotation of said fan generates air currents which pivot said deflector element counterclockwise, so that irrespective of the direction of rotation of said fan, said deflector element is located to open said outlet duct to generated air currents while at least generally closing an opposite side of said shroud to at least reduce recirculation of air therethrough.

2. An improved cooling system as defined in claim 1, wherein said shroud is generally circular in shape with said outlet duct being located at an upper end of same.

3. An improved cooling system as defined in claim 1 wherein said shroud is generally circular in nature with said fan eccentrically received therewithin; and wherein said deflector element is pivotally mounted above said fan.

4. An improved cooling system as defined in claim 1 wherein said shroud is symmetrical with respect top said fan received therewithin.

5. An improved cooling system as defined in claim 4 wherein said fan is eccentrically positioned within said shroud with said air deflector means being pivotally mounted along just beyond the periphery of said fan on an axis passing centrally through said fan.

6. An improved shroud for a bi-directional cooling fan comprising a housing, said hosing being generally circular in nature and having an outlet section secured thereto and extending outwardly therefrom, said housing being adapted to receive a fan therewithin eccentric to said circular configuration, and an air deflector element pivotally mounted within said housing just above and generally centrally located with respect to a location where said fan would be positioned, said air deflector element generally closing a side of said housing responsive to the rotation of said fan.

* * * * *